United States Patent Office 3,443,887
Patented May 13, 1969

3,443,887
RECOVERY OF PENTAVALENT VANADIUM VALUES FROM AQUEOUS SOLUTIONS USING α-HYDROXY OXIMES
Ronald R. Swanson, New Hope, Minn., assignor to General Mills, Inc., a corporation of Delaware
No Drawing. Filed June 1, 1967, Ser. No. 642,730
Int. Cl. C22b 55/00; C01c 1/00
U.S. Cl. 23—22     15 Claims

ABSTRACT OF THE DISCLOSURE

Pentavalent vanadium values are recovered from aqueous solutions by contacting such solutions with a liquid organic phase containing an α-hydroxy oxime of the idealized formula:

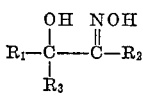

where $R_1$, $R_2$ and $R_3$ are alkyl groups of 1 to about 14 carbon atoms, $R_1$ and $R_3$ are attached to the hydroxyl substituted carbon atom through primary carbon atoms and the oxime contains a total of 8 to about 44 carbon atoms. The pentavalent vanadium values can be stripped from the organic phase by aqueous stripping solutions and then recovered from such stripping solutions.

---

The present invention relates to the recovery of pentavalent vanadium values from aqueous solutions thereof and in particular to a liquid-liquid ion exchange extraction process employing certain α-hydroxy oxime extractants.

I recently discovered that certain α-hydroxy oximes were especially valuable as extractants for copper values from aqueous solutions thereof. See United States Patent 3,284,501. One of the preferred copper extractants was found to be 5,8-diethyl-7-hydroxydodecan-6-oxime which has the structural formula:

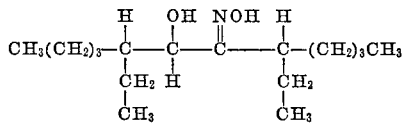

While said α-hydoxy oxime is a very good extractant for copper values and certain other metal values (see United States Patent 3,276,863), I found that the same could not be used commercially for the extraction of pentavalent vanadium values. Thus when such compound was dissolved in a water-immiscible organic solvent and contacted with an aqueous solution containing pentavalent vandium values, the pentavalent vanadium oxidized and thus rapidly destroyed the compound. Correspondingly, much of the vanadium in the aqueous phase is reduced to the tetravalent state and is not capable of being extracted into the organic phase even with the addition of fresh quantities of the described α-hydroxy oxime.

I have now discovered that certain α-hydroxy oximes are excellent extractants for pentavalent vanadium values and yet have a reasonably high stability to oxidation by the pentavalent vanadium. The -hydroxy oximes used in the process of the present invention have the following idealized structural formula:

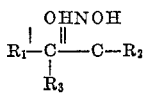

where $R_1$, $R_2$, and $R_3$ are straight or branched chain alkyl groups of 1 to about 14 carbon atoms with $R_1$ and $R_3$ being attached to the carbon atom substituted with the hydroxyl group through primary carbon atoms, said oximes being further characterized as having a total carbon atom content of 8 to about 44. It is preferred that $R_2$ and either $R_1$ or $R_3$ are the same and also that the oxime has a total carbon atom content of about 12 to 20.

While the invention is not fully understood, it is believed that the $R_3$ alkyl group substantially prevents the oxidation of the hydroxyl group to a carbonyl group by the pentavalent vanadium. Oxidation of the tertiary hydroxyl group would require a rupture of stable carbon-carbon bonds and apparently the pentavalent vanadium is not a strong enough oxidizing agent to significantly attack such tertiary hydroxyl group.

The α-hydroxy oximes used in the present invention are prepared by reacting the corresponding acyloins with a hydroxyl amine salt under reflux conditions. Such reaction can be carried out by refluxing the reactants in an alcohol, such as methanol, ethanol and the like. A weak base must be present to react with the acid part of the hydroxylamine salt. Sodium acetate or pyridine are preferred weak bases.

The starting acyloins are also prepared by well-known procedures. Thus an ester is dissolved in a suitable solvent such as ether or toluene containing sodium metal. This results in a condensation of two moles of the ester with the formation of the sodium salt of the enol form of a hydroxy ketone. An alkyl bromide or iodide is reacted with such salt and then the resulting product is decomposed by the addition of water to yield the acyloin. Relatively pure fractions of the acyloin can be obtained by distillation procedures. It is to be understood, of course, that mixtures of esters can be condensed to yield relatively complex products and that mixtures of two or more alkyl bromides or iodides can be employed in preparing the acyloins. The method of preparing the acyloins is described in J. Org. Chem. vol. 11, pp. 788–94 (1946), which disclosure is incorporated herein by reference.

The preparation of the α-hydroxy oximes is further described by the following examples.

EXAMPLE A

To a 1.5 l. resin flask equipped with a stirrer, temperature controller and an addition funnel was charged 46 gm. (2.0 gm. at.) of sodium metal and 500 ml. of toluene. The apparatus was flushed with nitrogen and heated to 105–110° C. The stirrer was started and 172.3 gm. (1.0 mole) of n-butyl-n-hexanoate was added over a ½-hour period. The mixture was held at 105–110° C. for an additional ½ hour and then cooled to 60° C. over a ½-hour period. To this viscous solution 137.0 gm. (1.0 mole) of n-butyl bromide was added over a 10 minute period and the reaction mixture was held at 60° C. for 24 hours. The resulting product was poured into water, the aqueous layer discarded and the toluene solution washed two times with water, one time with dilute sulfuric acid and three more times with water. The toluene was then stripped from the product by distillation and the residue was fractionally distilled to give 52.6 gm. of 7-n-butyl-7-hydroxy-dodecan-6-one collected at 150.5–152° C./6.1 mm. Hg.

To 38.5 gm. (0.15 mole) of the ketone was added 20.9 gm. (0.3 mole) of hydroxylamine hydrochloride, 27.1 gm. of sodium acetate and 75 ml. of methanol and the resulting reaction mixture was refluxed at 70–75° C. with stirring for 24 hours. The reaction product was cooled to room temperature, poured into water and extracted with ether. The ether layer was washed five times with water, dried over sodium sulfate and finally stripped of ether to give 38.0 gm. of a water white liquid identified as 7-n- butyl-7-hydroxydodecan-6-oxime having the idealized structural formula:

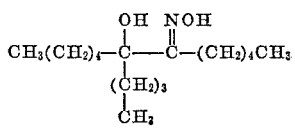

EXAMPLE B

Example A was essentially repeated using 158.2 gm. (1.0 mole) of n-butyl valerate, 46 gm. (2 gm. at.) of sodium, 500 ml. of toluene and 109.0 gm. (1.0 mole) of ethyl bromide. Twenty grams (0.1 mole) of the resulting 6-ethyl-6-hydroxydecan-5-one were then used with 13.9 gm. (0.2 mole) of hydroxylamine hydrochloride, 18 gm. of sodium acetate and 75 ml. of methanol in the preparation of the oxime which was identified as 6-ethyl-6-hydroxydecan-5-oxime having the idealized structural formula:

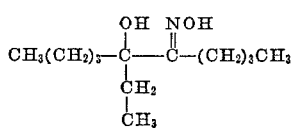

EXAMPLE C

Example A was essentially repeated using 474.7 gm. (3.0 moles) of n-butyl valeroate, 138 gm. (6 gm. at.) of sodium, 1600 ml. of toluene and 495.2 gm. (3.0 moles) of n-hexyl bromide. One hundred thirty grams (0.509 mole) of the resulting 6-n-butyl-6-hydroxydodecan-5-one were then used with 70.5 gm. (1.018 moles) of hydroxylamine hydrochloride, 91.9 gm. of sodium acetate and 150 ml. of methanol in the preparation of the oxime which was identified as 6-n-butyl-6-hydroxydodecan-5-oxime having the idealized structural formula:

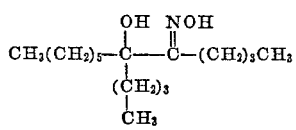

EXAMPLE D

Example A was esssentially repeated using 516.8 gm. (3.0 moles) of n-butyl-n-hexanoate, 138 gm. (6 gm. at.) of sodium, 1500 ml. toluene and 495.2 gm. (3.0 moles) of n-hexyl bromide. One half mole (142.24 gm.) of the resulting 7-n-pentyl-7-hydroxytridecan-6-one was then used with 1.0 mole (69.5 gm.) of hydroxylamine hydrochloride, 90.2 gm. of sodium acetate and 100 ml. of methanol in the preparation of the oxime which was identified as 7-n-pentyl-7-hydroxytridecan-6-oxime having the idealized structural formula:

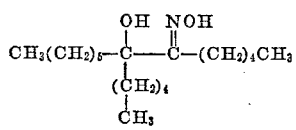

EXAMPLE E

Example A was essentially repeated using 258.4 gm. (1.5 moles) of n-butyl-n-hexanoate, 69 gm. (3.0 gm. at.) of sodium, 750 ml. of toluene and 298.7 gm. (1.5 moles) of 2-methyl-1-bromobutane. 48.3 gm. (0.212 mole) of the re- then used with 100 gm. (1.43 moles) of hydroxylamine as 6-(2-methylpropyl)-6-hydroxydecan - 5 - oxime having the idealized structural formula:

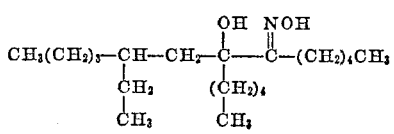

EXAMPLE F

Example A was essentially repeated using 316.5 gm. (2.0 moles) of n-butyl valeroate, 92 gm. (4.0 gm. at.) of sodium, 800 ml. of toluene and 302.1 gm. (2.0 moles) of 2-methyl-1-bromobutane. 48.3 gm. (0.212 mole) of the resulting 6-(2-methylpropyl)-6-hydroxydecan-5-one were then used with 100 gm. (1.43 moles) of hydroxylamine chloride, 129 gm. of sodium acetate and 250 ml. of methanol in the preparation of the oxime which was identified as 6-(2-methylpropyl)-6-hydroxydecan-5-oxime having the idealized structural formula:

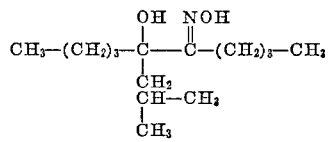

EXAMPLE G

Example A was essentially repeated using 316.5 gm. (2.0 moles) of n-butyl valeroate, 92 gm. (4.0 gm. at.) of sodium, 800 ml. of toluene and 302.1 gm. (2.0 moles) of 2-methyl-1-bromobutane. Seventy grams (0.289 mole) of the resulting 8-methyl-6-n-butyl-6-hydroxydecan-5 - one were then used with 100 gm. (1.445 moles) of hydroxylamine hydrochloride, 130 gm. of sodium acetate and 250 ml. of methanol in the preparation of the oxime which was identified as 8-methyl-6-n-butyl-6-hydroxydecan-5-oxime having the idealized structural formula:

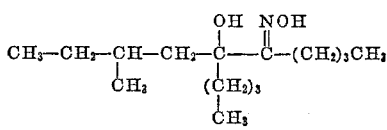

Broadly, the process of the present invention comprises contacting an aqueous solution containing pentavalent vanadium values with a liquid organic phase comprising a water-immiscible organic solvent and the α-hydroxy oxime compound whereby at least a portion of the pentavalent vanadium values are preferentially extracted into the organic phase. The loaded organic phase is then separated from the aqueous phase by virtue of the immiscibility of the said phases.

The α-hydroxy oxime is dissolved in a water-immiscible organic solvent prior to the contacting of same with the pentavalent vanadium containing solution. The term "water-immiscible organic solvent" as used herein refers to an organic material normally liquid at ambient temperatures which is substantially, but not necessarily entirely, insoluble in water. The preferred organic solvents for the process of the present invention are the hydrocarbons. Examples of suitable hydrocarbon solvents include isooctane, kerosene, "Soltrol 170" (a commercially available naphthenic hydrocarbon solvent) benzene, toluene, xylene, isodecane, fuel oils, mineral oils, hexane, heptane, octane, "Panasols" (commercially available petroleum aromatic solvents) and the like. Solvents which contain functional groups can also be employed providing that the functional groups do not adversely affect the extraction. Illustrative of such compounds are the alcohols, ketones, and esters such as naturally occurring vegetable oils. Chlorinated hydrocarbons such as carbon tetrachloride are also useful in the present process.

Generally, the α-hydroxy oxime extractant will be present in the organic phase in an amount sufficient to extract at least a portion of the pentavalent vanadium values from the aqueous solutions. Preferably, the oxime will be present in an amount of from about 2 to about 50% by weight based on the total organic phase with an amount of from 2 to 15% by weight being particularly preferred. The α-hydroxy oximes described hereinabove and useful in the process of the present invention are also characterized as having a solubility of at least about 2% by weight in the water-immiscible organic solvent used to make up the organic phase and substantially complete insolubility in water.

The organic phase may also contain other materials such as conditioners. If a conditioner is present, it will be used in amounts of from about 0.5 to 10 weight percent based on the total organic phase.

The volume phase ratio of the aqueous phase to the organic phase can vary widely depending on the concentrations, conditions, etc. The phase ratio will preferably be in the range of aqueous to organic of about 100:1 to 1:100 and more preferably in the range of about 10:1 to 1:10. The phase ratio and concentration of the α-hydroxy oxime will, of course, be adjusted so that at least a portion of the pentavalent vanadium values are transferred from the aqueous phase to the organic phase during the contacting step. Ideally, all or substantially all of such pentavalent vanadium values will be transferred leaving a vanadium barren aqueous phase. The aqueous and organic phases are preferably agitated during the contacting step. The extraction can be carried out at a wide variety of temperatures—from freezing point of the aqueous solution to the boiling point and even above where the process is performed under pressure. The phases must, however, remain liquid and ambient temperatures are entirely suitable and preferred.

After the contacting step, the organic and aqueous phases are separated by virtue of their immiscibility, such as by decantation, the use of separatory funnels and the like. The pentavalent vanadium values can then preferably be recovered from the loaded organic phase. One preferred method of recovering the said values is to contact the loaded organic phase with an aqueous stripping solution. A variety of stripping agents can be used although it is preferred to use aqueous solutions of inorganic bases or basic salts. A particularly preferred stripping solution is one containing about 300–400 gm./l. $NH_4Cl$ or $NA_2CO_3$ and having a pH of about 8–10 (adjusted with ammonia). The vanadium values are transferred to such preferred stripping solution as ammonium meta vanadate, $NH_4VO_3$, which can be recovered by evaporating the stripping solution. The ammonium meta vanadate finds use as a catalyst in the contact process for making sulfuric acid. The said vanadate can also be fused to yield red cake—$V_2O_5$. The latter is particularly useful in the production of ferrovanadium alloys which are used to improve the ductility of steel. $V_2O_5$ can also be derived from the vanadium pregnant stripping solution by acidifying same with $H_2SO_4$ to a pH of about 2.3 with heating. The $V_2O_5$ then precipitates and can be separated from the acidified stripping solution.

The volume phase ratio of the aqueous stripping solution and the organic phase can also be varied over wide limits. Preferably, the phase ratio of the stripping solution to the loaded organic phase will be in the range of about 100:1 to 1:100 and even more preferably in the range of about 10:1 to 1:10. The aqueous stripping solution and the organic phase are separated by virtue of their immiscibility.

The process of the present invention can be carried out in a continuous manner, especially when an aqueous stripping solution is employed. Thus a stream of the pentavalent vanadium containing aqueous solution can be continuously contacted with a stream of the solution of -hydroxy oxime in the water-immiscible organic solvent, the two phases can be continuously separated, the organic phase can be continuously stripped with the aqueous stripping solution, the two phases can be continuously separated, and the stripped organic phase containing the regenerated -hydroxy oxime can be continuously recycled for contacting further quantities of aqueous pentavalent vandaium solution. Fresh aqueous stripping solution can be continuously supplied to the stripping area of the process. Readily available continuous counter-current mixer-settler units can be used.

The invention is further described by the following examples. Said examples are illustrative only and do not constitute limitations on the invention.

EXAMPLE I

Various aliquots of a solution of 4.32 gm. of $Na_3VO_4 \cdot XH_2O$ in 1.1 of a 50% by weight aqueous solution of $H_3PO_4$ were placed in separatory funnels. Then 5 ml. aliquots of a solution of the oxime of Example A in kerosene (5 gms. oxime per liter of kerosene) were added to each separatory funnel and the funnels were shaken at ambient rom temperature for 2 minutes to equilibrate the mixtures. The phases were then separated and the aqueous phase was analyzed for residual pentavalent vanadium (it initially contained 0.556 gm./l. $V^{+5}$). The percent extraction was calculated and the results are set forth in the following Table I:

TABLE I

| Extraction No. | Vol. Aq. (ml.) | $V^{+5}$ Aq. (gm./l.) | Percent $V^+$ Extracted |
|---|---|---|---|
| 1 | 250 | 0.320 | 42.4 |
| 2 | 100 | 0.115 | 79.3 |
| 3 | 50 | 0.033 | 94.5 |
| 4 | 25 | 0.003 | 99.0 |

EXAMPLE II

Example I was repeated using varying amounts of the organic and aqueous phases and the aqueous phase initially contained more $V^{+5}$ (2.01 gm./l.—prepared by dissolving 7.84 gm. $Na_3VO_4 \cdot XH_2O$ in 500 ml. of a 50% by weight aqueous solution of $H_3PO_4$). Results are set forth in the following Table II:

TABLE II

| Extraction No. | Vol. Org. (ml.) | Vol. Aq. (ml.) | $V^{+5}$ Aq. (gm./l.) | Percent $V^{+5}$ Extracted |
|---|---|---|---|---|
| 1 | 25 | 25 | 0.001 | 99.9 |
| 2 | 15 | 30 | 0.026 | 98.6 |
| 3 | 10 | 50 | 0.340 | 83.0 |
| 4 | 5 | 50 | 1.088 | 45.8 |

EXAMPLE III

Example II was repeated except that the α-hydroxy oxime of Example A was replaced by the α-hydroxy oxime of Example E and the aqueous solution initially contained 1.027 gm./l. $V^{+5}$ (prepared by dissolving 15.68 gm. of $Na_3VO_4 \cdot XH_2O$ in 2 liters of a 50% by weight aqueous solution of $H_3PO_4$). Results are set forth in the following Table III:

TABLE III

| Extraction No. | Vol. Org. (ml.) | Vol. Aq. (ml.) | $V^{+5}$ Aq. (gm./l.) | Percent $V^{+5}$ Extracted |
|---|---|---|---|---|
| 1 | 10 | 25 | 0.0289 | 97.1 |
| 2 | 5 | 25 | 0.140 | 86.4 |
| 3 | 5 | 50 | 0.475 | 53.8 |
| 4 | 5 | 100 | 0.720 | 29.9 |

EXAMPLE IV

Example II was repeated except that the α-hydroxy oxime of Example A was replaced by the α-hydroxy oxime of Example F and the aqueous solution initially contained 0.970 gm./l. $V^{+5}$. Results are set forth in the following Table IV:

TABLE IV

| Extraction No. | Vol. Org. (ml.) | Vol. Aq. (ml.) | $V^{+5}$ Aq. (gm./l.) | Percent $V^{+5}$ Extraction |
|---|---|---|---|---|
| 1 | 10 | 25 | 0.0025 | 99.9 |
| 2 | 5 | 25 | 0.022 | 97.5 |
| 3 | 5 | 50 | 0.216 | 77.0 |
| 4 | 5 | 100 | 0.484 | 51.7 |

EXAMPLE V

Example II was repeated except that the α-hydroxy oxime of Example A was replaced by the α-hydroxy oxime of Example C and the aqueous solution initially contained 0.935 gm./l. $V^{+5}$. Results are set forth in the following Table V:

TABLE V

| Extraction No. | Vol. Org. (ml.) | Vol. Aq. (ml.) | $V^{+5}$ Aq. (gm./l.) | Percent $V^{+5}$ Extraction |
|---|---|---|---|---|
| 1 | 10 | 25 | 0.0025 | 99.9 |
| 2 | 5 | 25 | 0.0376 | 95.5 |
| 3 | 5 | 50 | 0.198 | 78.8 |
| 4 | 5 | 100 | 0.510 | 45.5 |

EXAMPLE VI

About 0.73 gm. of $Na_3VO_4 \cdot XH_2O$ was dissolved in 100 ml. of aqueous solutions of $H_2SO_4$ of varying concentrations. Twenty ml. aliquots of such pentavalent vanadium containing solutions were then contacted as in Example I with 10 ml. aliquots of a solution of the α-hydroxy oxime of Example A in kerosene (same concentration as in Example I). The results are set forth in the following Table VI:

TABLE VI

| Extraction No. | Wt. Percent $H_2SO_4$ Aq. | Initial $V^{+5}$ Aq. (gm./l.) | $V^{+5}$ Aq. (gm./l.) | Percent $V^{+5}$ Extraction |
|---|---|---|---|---|
| 1 | 5 | 1.032 | 0.384 | 62.7 |
| 2 | 10 | 0.975 | 0.360 | 63 |
| 3 | 25 | 0.985 | 0.194 | 80.3 |
| 4 | 50 | 0.987 | 0.09 | 91 |

EXAMPLE VII

Example VI was repeated except that the α-hydroxy oxime of Example A was replaced by the α-hydroxy oxime of Example E. The results are as follows:

TABLE VII

| Extraction No. | Wt. Percent $H_2SO_4$ Aq. | Initial $V^{+5}$ Aq. (gm./l.) | $V^{+5}$ Aq. (gm./l.) | Percent $V^{+5}$ Extracted |
|---|---|---|---|---|
| 1 | 5 | 1.032 | 0.784 | 24.0 |
| 2 | 10 | 0.975 | 0.744 | 23.7 |
| 3 | 25 | 0.985 | 0.574 | 41.7 |
| 4 | 50 | 0.987 | 0.0438 | 95.4 |

EXAMPLE VIII

Fifteen ml. aliquots of a solution of 19.6 gm. of $Na_3VO_4 \cdot XH_2O$ in 250 ml. of water adjusted to a pH of 1.5 with $H_2SO_4$ ($V^{+5}$ content was about 9.14 gm./l.) were placed in separatory funnels. Fifteen ml. aliquots of 0.1 M $NaHSO_4$, 0.1 M $NaHCO_3$, 0.1 M $Na_2CO_3$, 0.4 M $H_2SO_4$ and water were added to such funnels to adjust the pH. The resulting solutions were then shaken for two minutes at ambient room temperature with 10 ml. aliquots of a solution of the α-hydroxy oxime of Example A in kerosene (same concentration as in Example I). The results are set forth in the following Table VIII:

TABLE VIII

| Extraction No. | pH adjustment with— | pH of Aq. | $V^{+5}$ Aq. (gm./l.) | Percent $V^{+5}$ Extracted |
|---|---|---|---|---|
| 1 | 0.1 M $NaHSO_4$ | 1.70 | 3.02 | 33.9 |
| 2 | 0.1 M $NaHCO_3$ | 2.35 | 3.985 | 12.8 |
| 3 | 0.1 M $Na_2CO_3$ | 6.00 | 4.52 | 1.1 |
| 4 | 0.4 M $H_2SO_4$ | 1.28 | 2.65 | 42.1 |
| 5 | Water | 1.89 | 3.26 | 28.7 |

The data of Examples I–VIII show that the α-hydroxy oximes are very good extractants for pentavalent vanadium from aqueous solutions having a pH of less than 7.0. Optimum extraction is obtained as the volume phase ratio of organic to aqueous approaches 1:1 and the aqueous phase has a pH of less than about 2.0.

EXAMPLE IX

Nine hundred eighty ml. of a solution of 7.84 gm. of $Na_3VO_4 \cdot XH_2O$ in 1 l. of $H_2O$ adjusted to a pH of 1.5 with $H_2SO_4$ ($V^{+5}$ content of 1.01 gm./l.) was shaken for two minutes at ambient room temperature with 200 ml. of a solution of the α-hydroxy oxime of Example I in kerosene (same concentration as in Example I). The phases were separated and analyzed for $V^{+5}$. The aqueous phase contained 0.269 gm./l. residual $V^{+5}$ and the organic phase contained 3.63 gm./l. Thus 73.4% of the $V^{+5}$ was extracted from the aqueous solution.

Twenty ml. of the loaded organic and 10 ml. of an aqueous solution containing 50 gm./l. $Na_2CO_3$ and 25 gm./l. $NH_3$ were placed in a separatory funnel and shaken for 2 minutes at ambient room temperature. Analysis of the separated organic phase showed that it contained 3.232 gm./l. $V^{+5}$ indicating that 11.0% of the $V^{+5}$ had been stripped from the organic phase. When the procedure was repeated except that the shaking time was increased to 19½ hours and the temperature increased to 40° C., the percent $V^{+5}$ stripped was 90.1%. When the procedure was repeated except that only the temperature was raised to 49° C., the percent $V^{+5}$ stripped was 20.0%.

EXAMPLE X

Example IX was essentially repeated except that the resulting loaded organic phase analyzed 4.15 gm./l. $V^{+5}$ and 10 ml. aliquots of the loaded organic phase were shaken with 5 ml. aliquots of the aqueous stripping solution (5% by weight $Na_2CO_3$ and 2.5% by weight $NH_3$) at various intervals after being separated from the starting pentavalent vanadium containing solution. The results are set forth in the following Table X:

TABLE X

| Stripping No. | Time After Loading of Organic (min.) | Percent $V^{+5}$ Stripped |
|---|---|---|
| 1 | 2.5 | 86.1 |
| 2 | 5.5 | 84.5 |
| 3 | 11 | 78.8 |
| 4 | 23 | 70.7 |
| 5 | 60 | 50.05 |
| 6 | 120 | 34.7 |
| 7 | ¹4 | 18.6 |
| 8 | ¹7 | 19.0 |

¹ Days.

EXAMPLE XI

Example X was essentially repeated except that the organic phase was a solution of the α-hydroxy oxime of Example C in kerosene (same concentration as in Example V) and the loaded organic phase analyzed 4.10 gm./l. $V^{+5}$. Results are set forth in the following table:

TABLE XI

| Stripping No. | Time After Loading of Organic (min.) | Percent $V^{+5}$ Stripped |
|---|---|---|
| 1 | 2.5 | 87.0 |
| 2 | 5.5 | 84.2 |
| 3 | 10 | 78.7 |
| 4 | 20 | 73.4 |
| 5 | 63 | 61.6 |

EXAMPLE XII

Example XI was repeated except that the organic phase was loaded with 5.48 gm./l. $V^{+5}$. Results were as follows:

TABLE XII

| Stripping No. | Time After Loading of Organic (min.) | Percent $V^{+5}$ Stripped |
|---|---|---|
| 1 | 2.5 | 97.2 |
| 2 | 45 | 95.8 |
| 3 | 120 | 93.9 |
| 4 | ¹24 | 86.5 |

¹ Hours.

The data of Examples IX–XII show that the pentavalent vanadium values can be stripped from the loaded organic phase. When the stripping is carried out a short time after the loading of the organic is completed, larger amounts of pentavalent vanadium are stripped from the organic. Also when the organic phase is loaded with larger amounts of pentavalent vanadium, higher stripping percentages are obtained. While I do not wish to be bound by the following, it is believed that initially a 1:1 complex of the $V^{+5}$ and α-hydroxy oxime is formed. This complex is easily stripped and, in fact, substantially 100% of the $V^{+5}$ has been stripped where the loaded organic phase has been contacted immediately after the extraction step with the stripping solution. However, if excess α-hydroxy oxime is present in the loaded organic phase, a 2:1 oxime to $V^{+5}$ complex apparently forms with passage of time and such complex is not easily stripped. Thus the stripping percentage is reduced somewhat where the loaded organic phase is not stripped in a short period of time after the extraction step and excess oxime is present in such phase.

EXAMPLE XIII

A solution of 36.0 gm. of $Na_3VO_4 \cdot XH_2O$ in 1 l. of $H_2O$ was adjusted to a pH of 1.5 with $H_2SO_4$. Five hundred ml. of this solution containing 5.0 gm./l. $V^{+5}$ and 200 ml. of a solution of 10 gm. of the α-hydroxy oxime of Example A in 200 ml. of Skellysolve B (a normal hexane solvent) were combined in a 1 l. Morton flask and heated to 50° C. After agitating at this temperature for one day, the aqueous phase was analyzed for $V^{+4}$. The aqueous phase was found to contain only 0.07 gm./l. $V^{+4}$. Heating at 50° C. of 155 ml. of the organic phase and 390 ml. of the aqueous phase was continued for an additional 3 days. The aqueous phase at this point was found to contain only 0.05 gm./l. $V^{+4}$. This data indicates that very little, if any, oxidation of the α-hydroxy oxime had occurred.

In contrast, when the above procedure was repeated using 5,8-diethyl-7-hydroxydodecan-6-oxime in place of the oxime of Example A, the aqueous phase after the 1 day period analyzed 1.51 gm./l. $V^{+4}$ and after the additional 3 day period analyzed 1.84 gm./l. $V^{+4}$. This data shows that the oxime having the formula

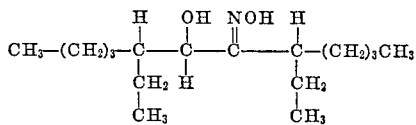

was oxidized to a considerable extent since $V^{+4}$ is insoluble in the organic phase. The principal degradation product was identified as the following

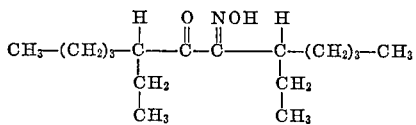

That the α-hydroxy oximes used in the process of the present invention are reasonably stable in the presence of pentavalent vanadium is further shown by the following examples:

EXAMPLE XIV

Twelve hundred milliliters of a solution of 39.2 gm. of $Na_3VO_4 \cdot XH_2O$ in 1 l. of water adjusted to pH 1.5 with $H_2SO_4$ (contained 5.0 gm./l. $V^{+5}$) and 300 ml. of a solution of 5 gm. of the α-hydroxy oxime of Example C in 100 ml. of iso-octane were placed in a flask and heated to 80° C. with stirring. The organic and aqueous phases were analyzed at various time periods and the results are set forth in the following Table XIII:

TABLE XIII

| Time | $V^{+5}$ Aq. (gm./l.) | $V^{+4}$ Aq. (gm./l.) | Organic Percent Degradation Products* | |
|---|---|---|---|---|
| | | | A | B |
| 8 days | 0.108 | 0.26 | 3 | Trace |
| 2 weeks | 0.103 | 0.389 | 5 | 1 |
| 6 weeks | 0.053 | 0.860 | | 8 |

*The percent is by weight based on the amount of the α-hydroxy oxime originally contained in the solution. The exact structures of the degradation products is unknown although they appear to fall into two categories. The first, A, appears to be an α-hydroxy ketone which may arise from a hydrolytic reaction. The second, B, has only been identified as a simple ketone which is most like an oxidation product.

EXAMPLE XV

Example XIV was essentially repeated except the aqueous phase was replaced by green acid liquid obtained from the $H_2SO_4$ leaching of western phosphate ores. Although not analyzed, such green acid liquid typically contains 25 to 35% $P_2O_5$, 5 to 25 g./l. $F^-$, 5 to 15 g./l. Fe and lesser amounts of vanadium (i.e. 1.0 g./l.), chromium and nickel with impurities accounting for the green color. The vanadium is present as $V^{+4}$ prior to oxidation of the liquor.

TABLE XIV

| Time (days) | Organic Percent Degradation Products* | |
|---|---|---|
| | A | B |
| 1 | 2 | 1.3 |
| 3 | 4 | 2 |
| 8 | 9 | 2.5 |
| 20 | 15.5 | 6 |

*See Table XIII footnote.

EXAMPLE XVI

Example XV was repeated except that 17 gm./l. of ammonium persulfate, $(NH_4)_2S_2O_8$, was added to the green acid liquor. The results are set forth in the following Table XV:

TABLE XV

| Time (days) | Organic Percent Degradation Products* | |
|---|---|---|
| | A | B |
| 2 | 4 | 7.5 |
| 5 | 11 | 12 |
| 19 | 22 | 16 |

*See Table XIII footnote.

EXAMPLE XVII

Example XV was repeated except that 5 gm./l. of potassium chlorate, $KClO_3$, was added to the green acid liquor. Results were as follows:

TABLE XVI

| Time (days) | Organic Percent Degradation Products* | |
|---|---|---|
| | A | B |
| 1 | 7.5 | 12 |
| 6 | 14 | 16 |
| 18 | 9 | 41 |

*See Table XIII footnote.

The data of Examples XIII–XVII show that the α-hydroxy oximes used in the process of the present invention are reasonably stable in the presence of $V^{+5}$ and oxidizing agents and thus they can be repeatedly recycled after stripping for contacting fresh quantities of pentavalent vanadium containing aqueous solutions.

The process of the present invention can be used to recover pentavalent vanadium values from acidic aqueous solutions obtained from any source. However, the process is particularly valuable for the recovery of such vanadium values from acid leach liquors such as those obtained in the sulfuric acid leaching of phosphate ores. In this respect, our process can be used to recover the vanadium from leach liquors containing phosphoric acid whereas the known organo phosphoric acid ester extractants are ineffective under these conditions.

It is to be understood that the invention is not to be limited to the exact details of operation or the exact processes shown and described, as obvious modifications and equivalents will be apparent to those skilled in the art and the invention is to be limited only by the scope of the appended claims.

The embodiments of the invention in which an exclusive property or privilege is claimed are defined as follows:

1. A process for the recovery of pentavalent vanadium values from an acidic aqueous solution thereof comprising: (1) contacting said aqueous solution with a liquid organic phase comprising a water-immiscible organic solvent and an α-hydroxy oxime to extract at least a portion of the pentavalent vanadium values into the organic phase, said oxime having the structural formula:

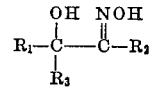

where $R_1$, $R_2$ and $R_3$ are alkyl groups of 1 to about 14 carbon atoms with $R_1$ and $R_3$ being attached to the carbon atom substituted with the hydroxyl group through primary carbon atoms and the oxime being further characterized as having a total carbon atom content of 8 to about 44; (2) separating the resultant pentavalent vanadium containing organic phase from the aqueous phase; and (3) recovering the pentavalent vanadium containing organic phase.

2. The process of claim 1 wherein one of the alkyl groups $R_1$ and $R_3$ is the same as $R_2$.

3. The process of claim 1 wherein the α-hydroxy oxime has a total carbon atom content of about 12 to 20.

4. The process of claim 1 wherein the α-hydroxy oxime is 7-n-butyl-7-hydroxydodecan-6-oxime.

5. The process of claim 1 wherein the α-hydroxy oxime is 6-n-butyl-6-hydroxydodecan-5-oxime.

6. The process of claim 1 wherein the volume phase ratio of the aqueous phase to the organic phase is in the range of about 100:1 to 1:100.

7. The process of claim 1 wherein the water-immiscible organic solvent is a liquid hydrocarbon and the α-hydroxy oxime is used in an amount of about 2 to 50% by weight based on the organic phase.

8. The process of claim 1 wherein the pentavalent vanadium values are removed from the pentavalent vanadium containing organic phase by (4) contacting said phase with an aqueous stripping medium to strip at least a portion of the pentavalent vanadium values from the organic phase and (5) separating the organic phase from the pentavalent vanadium containing stripping solution.

9. The process of claim 8 wherein the aqueous stripping medium is an aqueous solution of an inorganic base or basic salt.

10. The process of claim 8 wherein the volume phase ratio of the organic phase to the aqueous stripping medium is in the range of about 100:1 to 1:100.

11. The process of claim 8 wherein the aqueous stripping medium is an aqueous solution of ammonia and sodium carbonate.

12. The process of claim 11 wherein ammonium meta vanadate is removed from the aqueous stripping medium.

13. The process of claim 12 wherein the ammonium meta vanadate is fused to $V_2O_5$.

14. The process of claim 8 wherein the separated organic phase is continuously recycled for contacting further quantities of pentavalent vanadium containing solution.

15. The process of claim 8 wherein the pentavalent vanadium containing aqueous solution is acidified with phosphoric acid, sulfuric acid or a combination of such acids and has a pH of less than about 2.0, the water-immiscible organic solvent is kerosene, the α-hydroxy oxime is 6-n-butyl-6-hydroxydodecan-5-oxime and is present in the organic phase in an amount of about 2 to 15% by weight, the volume phase ratio of the aqueous phase to the organic phase is in the range of about 10:1 to 1:10, the aqueous stripping medium is an aqueous solution of ammonia and sodium carbonate and the volume phase ratio of the pentavalent vanadium containing organic phase to the aqueous stripping phase is in the range of 10:1 to 1:10.

References Cited
UNITED STATES PATENTS

| | | | |
|---|---|---|---|
| 3,088,798 | 5/1963 | Fetscher | 75—121 X |
| 3,088,799 | 5/1963 | Fetscher | 75—121 X |
| 3,224,873 | 12/1965 | Swanson | 75—117 X |
| 3,276,863 | 10/1966 | Drobnick et al. | 75—108 |
| 3,284,501 | 11/1966 | Swanson | 75—117 X |

HERBERT T. CARTER, *Primary Examiner.*

U.S. Cl. X.R.

23—24, 51, 140; 75—121

UNITED STATES PATENT OFFICE
CERTIFICATE OF CORRECTION

Patent No. 3,443,887                                                  May 13, 1969

Ronald R. Swanson

It is certified that error appears in the above identified patent and that said Letters Patent are hereby corrected as shown below:

Column 1, lines 68 to 72, that portion of the formula reading

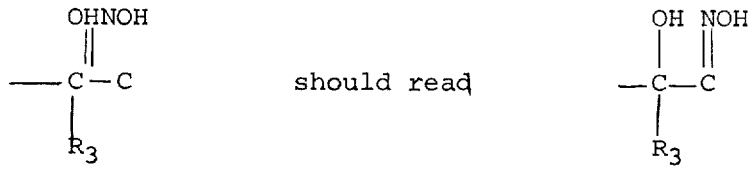

Column 3, line 65, beginning with "298.7 gm. (1.5 moles)" cancel all to and including "structural formula:" in line 69, same column 3 and insert -- 289.7 gm. (1.5 mole) of 2-ethyl-hexyl bromide. 93.8 gm. (0.3 mole) of the resulting 9-ethyl-7-n-pentyl-7-hydroxytridecan-6-one were then used with 41.7 gm. (0.6 mole) of hydroxylamine hydrochloride, 54.1 gm. of sodium acetate and 100 ml. of methanol in the preparation of the oxime which was identified as 9-ethyl-7-n-pentyl-7-hydroxytridecan-6-oxime having the idealized structural formula: --. Column 5, line 71, "vandaium" should read -- vanadium --. Column 6, line 6, "1.1" should read -- 1 l. --; Table I, right-hand column reading

| Percent $V^+$ Extracted | | Percent $V^{+5}$ Extracted |
|---|---|---|
| 42.4 | | 42.4 |
| 79.3 | should read | 79.3 |
| 94.5 | | 94.0 |
| 99.0 | | 99.5 |

Table IV, first numeral in right-hand column, "99.9" should read -- 99.6 --.
Column 9, lines 71 and 73, "liquid", each occurrence, should read -- liquor --.
Column 12, line 4, "removed" should read -- recovered --.

Signed and sealed this 24th day of March 1970.

(SEAL)
Attest:

EDWARD M. FLETCHER, JR.                                  WILLIAM E. SCHUYLER, JR.
Attesting Officer                                                       Commissioner of Patents